United States Statutory Invention Registration [19]

[11] Reg. Number: H745

Ishizuka et al. [43] Published: Feb. 6, 1990

[54] ION-SELECTIVE ELECTRODE FOR MEASURING CARBONATE CONCENTRATION

[75] Inventors: Kimiko Ishizuka; Osamu Seshimoto, both of Asaka, Japan

[73] Assignee: Fuji Photo Film Co., Ltd., Kanagawa, Japan

[21] Appl. No.: 169,288

[22] Filed: Mar. 17, 1988

[30] Foreign Application Priority Data

Mar. 17, 1987 [JP] Japan ..... 62-61889

[51] Int. Cl.[4] ..... G01N 27/46

[52] U.S. Cl. ..... 204/418

*Primary Examiner*—John F. Terapane
*Assistant Examiner*—Daniel S. Metzmaier
*Attorney, Agent, or Firm*—Jules E. Goldberg

[57] ABSTRACT

An ion-selective electrode for measuring carbonate concentration comprising a conductive metal layer, a halide of said conductive metal layer, a carbonate ion-selective layer containing ion carrier, and a buffer layer containing a hydrophilic polymer binder and a buffer laminated in this order on an electrically insulating support, and a pair of the above electrodes.

It is characterized by not having the electrolyte layer containing hydrophilic polymer binder, having the possibility of degradation of the electrolyte layer by the absorption of moisture being extremely little, and having a good stability in the course of time. In the electrode of the invention, the ion-selective layer comprised of hydrophobic organic material is directly laminated on the metal halide layer, the adhesive strength between the metal halide layer and the ion-selective layer is sufficient, the strength of the ion-selective layer is sufficiently great, and which is stable. The electrode of the invention has a sufficient buffering ability, and it requires neither operation of preliminary measurement of the pH value of aqueous liquid sample nor fixation of the pH value by adding a pH buffer to sample. Moreover, the adverse affect (measuring error) by the interfering substance such as salicylate, p-aminosilicylate or gentisate is eliminated or remarkably reduced.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ION-SELECTIVE ELECTRODE FOR MEASURING CARBONATE CONCENTRATION

BACKGROUND OF THE INVENTION

1. Field the Invention

This invention relates to an ion-selective electrode for measuring carbonate concentration and an ion-selective electrodes pair for measuring carbonate concentration in an aqueous liquid sample. More particularly, this invention relates to an ion-selective electrode for measuring carbonate concentration and an ion selective electrodes pair for measuring carbonate concentration useful for clinical assay where aqueous liquid sample, particularly biological body fluid such as blood, lymph, saliva or urine is measured.

2. Description of the Prior Art

In order to maintain the pH of various biological body fluid represented by blood, there are physicochemical buffer system and physiological buffer system by lung and kidney in living body, and among them, bicarbonate or hydrogencarbonate buffer system of blood plasma is the most important.

As an ion-selective electrode for measuring total carbonate (carbonate ion) concentration potentiometrically, an ion-selective electrode for the analysis of carbonate concentration in liquid is disclosed in U.S. Pat. No. 4,272,328. The ion-selective electrode is composed of a reference electrode comprised of a conductive metal layer and a metal halide layer laminated thereon, an electrolyte layer, an ion-selective membrane zone or layer containing an ion carrier or an ionophore, and a buffer layer laminated in this order. This ion-selective electrode is resistant to the interference by salicylate, p-aminosalicylate, gentisate and the like, and measuring error is little. However, since the electrolyte layer contains hydrophilic polymer binder, this layer is liable to be separated from the ion-selective layer composed of hydrophobic organic material because of insufficient adhesive strength. Moreover, the strength of the ion selective layer is also insufficient. In addition, since the electrolyte layer containing hydrophilic polymer binder is subject to absorb moisture, and the stability of the electrode itself becomes worse in the course of time.

SUMMARY OF THE INVENTION

An object of the invention is to provide an ion-selective electrode for measuring carbonate concentration or ionic activity by potentiometrical (electric potential) method which has no electrolyte layer containing hydrophilic polymer binder, extremely little possibility of deterioration of the electrolyte layer by the absorption of moisture, and a good stability in the course of time.

Another object of the invention is to provide a stable ion-selective electrode for measuring carbonate concentration wherein an ion-selective layer consisting of hydrophobic organic material is directly laminated on a metal halide layer, the adhesive strength between the metal halide layer and the ion-selective layer is sufficient, and the strength of the ion-selective layer is sufficiently great.

Another object of the invention is to provide an ion-selective electrode for measuring carbonate concentration requiring neither operation of preliminary measurement of the pH value of aqueous liquid sample nor fixation of the pH value by adding a pH buffer to sample.

Another object of the invention is to provide an ion-selective electrode for measuring carbonate concentration wherein the measuring error caused by interfering substance, such as salicylate, p-aminosalicylate or gentisate, having a possibility of existing in aqueous liquid sample is substantially eliminated.

These objects have been achieved by, (1) An ion-selective electrode for measuring carbonate concentration or ionic activity comprising a conductive metal layer, a halide of said conductive metal layer, a carbonate ion-selective layer containing ion carrier, and a buffer layer containing a hydrophilic polymer binder and a buffer laminated in this order on an insulating support, and (2) An ion-selective electrodes pair which consists of two ion selective electrodes for measuring carbonate concentration being substantially electrically insulated from each other, comprising being insulated electrically the conductive metal layer disposed on an electrically insulating support by the groove reaching said support, and laminating a pair of halide of said conductive metal layers opposite to each other through said groove, a carbonate ion selective layer containing an ion carrier being provided to fill said groove and to cover said halide layers in common and a buffer layer composed of the hydrophilic polymer binder containing a pH buffer composition being provided on said conductive metal layer in common, in this order.

Figure 1:
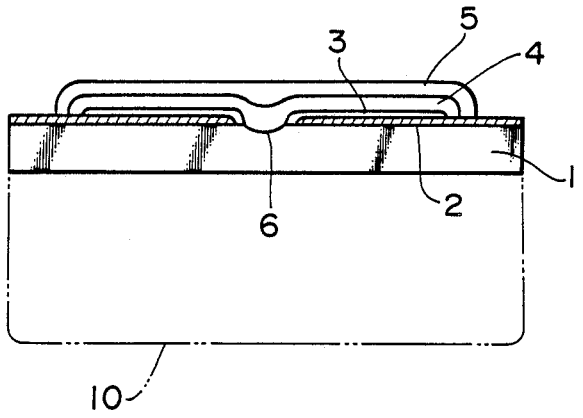
FIG. 1 is an embodiment of the ion-selective electrode for measuring carbonate concentration of the invention. It is a schematic sectional view in the direction crossing at right angles the cut groove of a pair of ion-selective electrodes for measuring carbonate concentration being electrically insulated by providing the shallow cut groove reaching an electrically insulating support in the center of a conductive metal layer. The descriptions in parenthesis indicate the layers in the embodiment described in Example 1.

1. Electrically insulating support (PET sheet)
2. Conductive metal layer (Deposited silver layer)
3. Halide of conductive metal layer (Silver chloride layer)
4. Carbonate ion-selective layer
5. Buffer layer
6. Cut groove
10. Ion-selective electrodes pair for measuring carbonate concentration

DETAILED DESCRIPTION OF THE INVENTION

The electrically insulating support may be selected from known organic polymers having substantially electrical insulation property and glass support to use. As the examples of preferable electrically insulating support, there are polycarbonate of bisphenol A, polyethylene terephthalate and cellulose esters such as cellulose triacetate and cellulose acetate propionate being sheet-shaped. The thickness of the sheet-shaped support is in the range of about 80 μm–about 2 mm, preferably about 100 μm–about 1 mm.

As the examples of the metal usable for the conductive metal layer, there are silver, nickel, gold, platinum and the like, and the preferable metal among these is silver. As the conductive metal layer, the layers coated on the surface of the support by a known method such as electroless plating or vacuum deposition are usable.

The conductive metal layer is more than about 400 nm, preferably in the range of about 600 nm–about 100 μm in thickness or the range of about 100 mg/m$^2$ about 2.0 g/m$^2$ in coated amount.

The halide of conductive metal layer (hereinafter referred to as metal halide layer) can be provided according to the known method described in U.S. Pat. Nos. 4,214,968, 4,259,164, Japanese Patent KOKAI No. 57—17851 or etc. That is, it can be formed by the method of treating the coated metal layer by oxidation - halogenation with the oxidizing agent containing a metal halide or the method of depositing metal halide by vacuum deposition or chemical deposition. The coating amount of the metal halide layer is in the range of about 100 mg/m$^2$–about 2.0 g/m$^2$. The most preferable combination of the conductive metal layer and the metal halide layer is silver layer - silver chloride layer. Hereafter, the half cell (or single electrode) composed of the lamination of the conductive metal layer (containing the support) and the halide of the conductive metal layer thereon is sometimes called reference electrode.

The ion-selective layer may be selected from the known ion-selective layers containing a polymer binder, an ion carrier or an ionophore and an ion carrier solvent to use. As the polymer binder usable for the ion-selective layer, there are polyvinyl chloride, vinylidene chloride - vinyl chloride copolymer, vinyl chloride-vinyl acetate copolymer, vinyl chloride - vinyl acetate - vinyl alcohol ternary copolymer, vinylidene chloride - acrylonitrile copolymer, carboxylated polyvinyl chloride, polycarbonate of bisphenol A and the like.

As the ion carrier, the 4-alkyl-α,α,α-trifluoroacetophenone compound represented by the general formula;

R—(p—Phn)—C(=0—$CF_3$ (p—Phn represents p-phenylene group.)

R represents linear or branched alkyl group such as butyl group, hexyl group, octyl group, decyl group or dodecyl group.

is used.

As the ion carrier solvent, various polymer plasticizers being liquid at ordinary temperature are usable, including didecylphthalate, diisodecylphthalate, dioctylphthalate, dioctylsebacate, dioctyladipate, trioctyltrimellitate, tris(2-ethylhexyl) phosphate, dioctylglutarate, and the like. An ion-exchanger may further be incorporated in the ion-selective layer. As the ion exchanger, the substance like the quaternary ammonium salt capable of exchanging selectively with carbonate ion is preferable. As the examples of the quaternary ammonium salt, there are trioctylmethylammonium chloride, trioctylpropylammonium chloride, trioctylmethylammonium bromide, trioctylmethylammonium iodide and the like.

In addition, decylbenzene, diphenylether, and the like may be incorporated in the ion-selective layer, in order to eliminate or decrease the affect of interfering substances such as salicylate, p-aiinosalicylate and gentisate.

Besides, a surfactant may be incorporated in the ion-selective layer. As the surfactant, nonion surfactants such as octylphenoxypolyethoxyethanol and p-nonylphenoxypolyglycidol and silicone surfactants having polysiloxane structure such as poly(dioctyl-comethylphenylsiloxane) are usable.

The coating amounts of the ion-selective layer components are a follows:

Polymer binder: About 5.0 g/m$^2$–about 30 g/m$^2$
Ion carrier: About 1.0 g/m$^2$–about 25 g/m$^2$
Ion carrier solvent: About 1.0 g/m$^2$–about 25 g/m$^2$
Ion exchanger: About 100 mg/m$^2$–about 10 g/m$^2$
Interfering substance-eliminating component: 0--about 5.0 g/m$^2$
Surfactant: About 10 mg/m$^2$ about 2.5 g/m$^2$ (The coating amount 0 indicates not to contain the component.)

The ion-selective layer can be provided according to the known method described in U.S. Pat. Nos. 4,214,968, 4,272,328 or the like. For example, the ion carrier is dissolved in the solvent for ion carrier, and the mixture is dissolved or suspended into the solution of the polymer binder. The mixture thus obtained is applied on the metal halide layer of reference electrode, followed by drying to remove the solvent of the polymer binder to form the ion-selective layer. As the solvent usable for the solution of the polymer binder, there are various known organic solvents including 2-butanone and tetrahydrofuran.

The buffer layer is the layer where the pH buffer component is suspended or dissolved in the hydrophilic polymer binder in the amount sufficient for maintaining the pH value to about 7.5–about 9.5 at the time when an aqueous liquid sample permeates the layer. The affect of the interfering substance such as salicylate, p-aminosalicylate and gentisate can be eliminated or decreased by the sufficient buffering ability of the buffer layer.

The usable buffers include the salts of the known alkalies having the dissociation constant (pKa) in the range of about 8.0–about 9.0 among the pH buffers described in Ed. by The Chemical Society of Japan, "Kagaku Benran Kiso Hen (Manual in Chemistry, Fundamentals Volume)" (Maruzen, Tokyo, 1966) pages 1312–1320, Ed. by R. M. C. Dawson et al, "Data for Biochemical Research" Second Edition (Oxford at the Clarendon Press, 1969) pages 476–508, "Biochemistry", 5, pages 467–(1966), "Analytical Biochemistry", 104, pages 300–310 (1980) and the like. The usable alkalies in the pH buffer composition include tris(hydroxymethyl-)aminomethane, diethanolamine, 2-amino-2-methyl-1,3-propanediol, 2-amino-2-ethyl-1,3-propanediol and the like, and the usable acid for forming the salts includes the acid represented by HX (H is a proton, X is the anion not to inhibit remarkably the response to $CO_3^{2-}$ such as $Cl^-$, $Br^-$, $F^-$ and I-) such as acrylic acid and sulfo-group containing polymer. The salts of N,N-bis(2-hydroxyethyl)glycine, tris(hydroxymethyl) methylaminopropanesulfonic acid or the like and LiOH, NaOH or the like are also usable.

The usable hydrophilic polymer binder includes gelatin, agarose, cellulose ester and synthetic vinyl polymers such as polyacrylate-co-acrylamide-co-methacryl alcohol. In general, a surfactant and a plasticizer are incorporated in the buffer layer in addition to the hydrophilic polymer binder and pH buffer component. Besides, for example, in the case of using gelatin as the hydrophilic polymer binder, a viscosity increasing agent and a cross-linking agent (curing agent or hardening agent; preferable examples, bis(vinylsulfonylmethyl)ether, bis [(vinylsulfonylmethylcarbonyl-)amino]methane, etc.) may be added.

The coating amounts of the buffer layer components are as follows:

Hydrophilic polymer binder: About 2.5 g/m$^2$–about 30 g/m$^2$ pH buffer component: About 20 mmol./$m^2$–about 500 mmol./$m^2$
Surfactant: About 10 mg/$m^2$–about 5.0 g/$m^2$
Plasticizer: 0–about 3.0 g/$m^2$
Thickening agent: 0–about 1.0 g/$m^2$
Crosslinking agent: 0–about 1.0 g/$m^2$
(The coating amount 0 indicates not to contain the component.)

The structures and laminations of an ion-selective electrode for measuring carbonate concentration and an ion-selective electrodes pair for measuring carbonate concentration of the invention are explained by using a drawing. FIG. 1 is an embodiment of the ion-selective electrodes pair for measuring carbonate concentration of the invention. It is a schematic sectional view in the direction crossing at right angles the cut groove of a pair 10 of ion-selective electrodes for measuring carbonate concentration being electrically insulated by providing the shallow cut groove 6 reaching an electrically insulating support 1 in the center of a conductive metal layer 2. The fundamental structure of an ion-selective electrode for measuring carbonate concentration being another embodiment of the invention is shown as the right (or left) half part cut by the cut groove 6 in FIG. 1. The layers from the conductive metal layer 2 to the buffer layer 5 are enough to be in contact with each other so as to complete electrochemical contact at the time when they are moistened by spotting an aqueous liquid sample on the buffer layer 5. However, they are necessary to be bonded to each other to the strength not to generate the separation between respective layers at the time of cutting during manufacturing processes of the electrode. The electrode may be manufactured according to the manufacturing method described in U.S. Pat. Nos. 4,053,381, 4,214,968, 4,272,328, 4,528,085, 4,683,048 or the like. Among these methods, the method described in U.S. Pat. No. 4,683,048 is preferable. That is, the manufacturing method of ion-selective electrode comprises cutting the metal layer 2 provided on the electrically insulating support 1 by a cutting tool or the like in the longitudinal direction to provide a groove 6 and making the metal layers 2 separated by the groove 6 electrically independent, thereafter, providing a metal halide layer 3 on the surfaces of the metal layer, and subsequently, providing a common carbonate ion-selective layer 4. By this method, the ion-selective electrodes pair 10 for measuring carbonate concentration of which electrochemical properties are uniform well can be formed.

The thickness of the respective layers composing the electrode are in the following ranges:
Electrically insulating support: About 50 μm–about 500 μm
Conductive metal layer: About 800 nm–about 2.0 μm
Metal halide layer: About 200 nm–about 1.0 μm
Carbonate ion-selective layer: About 5 μm–about 30 μm
Buffer layer: About 5 μm–about 30 μm As one preferable embodiment, the buffering ability of the buffer layer can be increased by providing a hydrophobic or weakly hydrophilic thin protective coat layer to decrease the hydrophilic property of the surface of the buffer layer. The coat layer usable for this embodiment includes hydrophobic or weakly hydrophilic organic polymers such as synthetic celluloses, such as cellulose ester and hydroxypropylcellulose, containing a polyol compound such as glycerol as a moisture retentive agent. These can be coated by applying the solution of an organic solvent (ethanol, isopropanol, etc.).

The coating amounts of the protective coat layer are as follows:
Polymer: About 100 mg/$m^2$–about 5.0 g/$m^2$
Surfactant: About 10 mg/$m^2$–about 1.0 g/$m^2$
Moisture retentive agent: 0–about 1.0 g/$m^2$ The ion-selective electrode (pair) for measuring carbonate concentration of the invention may be incorporated into the one tip type ionic activity measuring device (or article) for simultaneous measuring many ion species, composed so as to conduct electrically among one porous bridge and plural pairs of ion-selective electrodes by each one spotting operation of reference solution and sample solution, by disposing to fix one porous bridge (preferable example: polyethylene terephthalate fiber spun thread) and plural pairs (each pair is different) of ion-selective electrodes, described in U.S. Pat. No. 4,437,970, JA KOKAI No. 61-145450, EP No. 0 212 612A, etc. As preferable combinations, for example, there are a twin type of pH electrode and carbonate electrode and carbonate electrode and triplet type of pH electrode, Ca electrode and carbonate electrode. Moreover, it may be incorporated into the ionic activity measuring instrument for measuring one kind ion described in U.S. Pat. No. 4,053,381, etc.

The measurement of carbonate concentration may be performed by the method described in U.S. Pat. Nos. 4,437,970, 4,683,048, etc. The liquid drop in the range of about 5 μl–about 100 μl of an aqueous liquid sample is spotted onto the measuring electrode (one electrode), and the liquid drop in the range of about 5 μl–about 100 μl of a reference solution having a known carbonate ion concentration is spotted onto the reference electrode (the other electrode). Both solutions are allowed to permeate the porous bridge (not illustrated) linking the measuring electrode and the reference electrode directly or through a porous liquid distribution member (such as loose fabric), and then, they are electrically connected by contacting the interfaces of both solutions. The probe (not illustrated) of a potentiometer is electrically contacted with the bare region of each metal layer 2 of the electrodes pair to form a closed circuit, and electric potential difference is measured. The measured electric potential difference is converted to carbonate ion concentration (or ionic activity) by using a calibration curve. By performing these operations using the analyzer described in EP No. 0 154 147A, etc., simple operation and accurate measurement can be achieved.

The ion-selective electrode (pair of the invention for measuring potentiometically the carbonate concentration in an aqueous liquid sample has the following characteristics: (1) Since it has the buffer layer having a sufficient buffering ability, it is not necessary to adjust the aqueous liquid sample by buffering prior to measurement nor to fix the pH value by adding a buffer. Moreover, the adverse affect (measuring error) by the interfering substance such as salicylate, p-aminosalicylate or gentisate is eliminated or remarkably reduced.

(2) The stability in the course of time is excellent compared with the ion-selective electrode having the electrolyte layer containing an electrolyte in a hydrophilic polymer binder as described in US 4 272 328, etc.

(3) Since $CO_3^{2-}$ or $HCO_3^-$ ion concentration can be determined accurately in a good reproducibility, it may be used as the quantitative analysis in clinical assay field required a high accuracy.

(4) Though it is characterized by the absence of the electrolyte layer compared with the ion-selective electrode for measuring carbonate concentration described in U.S. Pat. No. 4,272,328, etc., the manufacturing method is similar to the electrode having the electrolyte layer.

Accordingly, since the setting process of the electrolyte layer can be omitted, the manufacturing process is simple, the manufacturing cost can be reduced, and it is economically advantageous.

EXAMPLES

Example 1

Polyethylene terephthalate (PET) sheet (support) having flat surfaces, having a thickness of 180 μm, a width of 32 mm and having a silver layer about 800 nm in thickness deposited on its surface was provided. So as to function as a pair of electrodes, the center of the deposited silver layer was cut into the shallow U-groove about 0.5 mm in width about 10 μm in depth from the surface of the PET sheet by a cutting tool to insulate electrically. Subsequently, liquid polymer resist membranes containing polyvinyl chloride as a principal component was coated on both end portions of the above deposited silver layer each at a width of about 5 mm, and dried to provide resist coat membranes. Then, the surface of the silver layer was treated with an aqueous solution containing 16 mMol./l of hydrochloric acid and 36 mMol./l of potassium dichromate (oxidation-halogenation treating solution) for about 60 seconds, and washed with water. It was dried to form silver chloride layer on the surface portion of the deposited silver layer, and a film shaped silver-silver chloride internal reference electrode was prepared. Subsequently, the following coating amounts of carbonate ion-selective layer components in a methyl ethyl ketone solution was applied directly on the silver chloride layer, and dried to form a carbonate ion-selective layer. On the ion-selective layer, the following coating amounts of buffer layer components in an aqueous solution was applied, and dried to prepare the film shaped ion-selective electrode pair (A) for measuring carbonate concentration of the invention shown in a schematic sectional view of FIG. 1. Another film shaped carbonate ion-selective electrode pair (B) not provided with the buffer layer was separately prepared, and this was used as a control.

| Coating amounts of ion-selective layer components (per 1 $m^2$) | |
|---|---|
| Vinyl chloride-vinyl acetate copolymer (chemical composition ratio 90:10) | 8.0 g |
| Vinyl chloride-vinyl acetate-vinyl alcohol ternary copolymer (chemical composition ratio 91:3:6) | 8.0 g |
| 4-Dodecyltrifluoroacetophenone | 8.0 g |
| Dioctylphthalate | 8.0 g |
| Trioctylmethylammonium chloride | 3.2 g |
| Polysiloxane surfactant | 20 mg |
| **Coating amounts of buffer layer components (per 1 $m^2$)** | |
| Acrylate-acrylamide-methacryl alcohol ternary copolymer (chemical composition ratio 10:87:3) | 15.0 g |
| 2 Amino-2-hydroxymethyl 1,3-propanediol (84 mMol.) | 10.2 g |
| 2 Amino-2-hydroxymethyl-1,3-propanediol-HCl salt (84 mMol.) | 13.3 g |
| Nonylphenoxypolyglycidol (containing 10 glycidol units on average) | 2.0 g |

Using the above electrodes pairs (A) and (B), as to the samples (human sera) at the three levels shown in Table 1, comparative measurements of appearance potential difference were carried out by differential method where the spotting amount was 15 μl and the measuring time was 10 minutes. As a result, in the case of the electrodes couple (A) having the buffer layer, the potential gradient (−26 mV/dec.) obtained was extremely close to the theoretical value of Nernst's equation (−29 mV/dec.).

TABLE 1

| Sample No. | 11 | 12 | 13 |
|---|---|---|---|
| Carbonate content (mMol.) | 9.5 | 20.5 | 35.8 |
| pH | 7.29 | 7.40 | 7.65 |
| Measured Potential (mV) | | | |
| Electrodes pair (A) | 25.2 | 15.8 | 3.4 |
| Electrodes pair (B) | 4.1 | −4.2 | −10.5 |

Comparative Example 1

A comparative film shaped electrode pair (C) was prepared similar to Example 1, except that an electrolyte layer was provided between the silver chloride layer and ion-selective layer by applying the following coating amounts of the electrolyte layer components in an aqueous solution and drying in the manufacturing process of the film shaped electrode pair (A) of Example 1.

| Coating amounts of electrolyte layer components (per 1 $m^2$) | |
|---|---|
| Deionized gelatin | 5.0 g |
| NaCl | 1.9 g |
| KCl | 0.6 g |
| Nonylphenoxypolyglycidol (containing 10 glycidol units on average) | 30 mg |

After the electrodes pairs (A) and (C) were left in exposed state in a room at about 23° C. at a relative humidity of about 50% for 1 hour, the ion-selective layers were peeled off. As a result, in the case of the electrode (C), the ion-selective layer could be peeled without turbulence easier than the electrode (A). By this experiment, it was made clear that the adhesive property between the electrolyte layer and the ion-selective layer of the electrode (C) was not well but weak.

Comparative Example 2

A comparative electrodes pair (D) was prepared similar to Example 1, except that a buffer layer was provided by applying the following coating amounts of the buffer layer components in an aqueous solution and drying in the manufacturing process of the film shaped electrode pair (A) of Example 1.

| Coating amounts of buffer layer components (per 1 $m^2$) | |
|---|---|
| Deionized gelatin | 15.0 g |
| 2-Amino-2-hydroxymethyl-1,3-propanediol (84 mMol.) | 10.2 g |
| 2-amino-2-hydroxymethyl-1,3-propanediol-HCl salt (84 mMol.) | 13.3 g |
| Nonylphenoxypolyglycidol (containing 10 glycidol units on average) | 2.0 g |

Using the electrodes pair (D), as to the control sera at the four levels different in carbonate concentration shown in Table 2, measurements of appearance potential difference were carried out in a similar manner to Example 1, the potential gradient close to the theoretical values were obtained a shown in Table 2.

TABLE 2

| Appearance Potentials in Electrodes Couple (D) | | | | |
|---|---|---|---|---|
| Sample No. | 21 | 22 | 23 | 24 |
| Carbonate content (mM) | 9.3 | 15.5 | 24.6 | 40.2 |
| Potential (mV) | −0.8 | −6.7 | −12.2 | −18.0 |

Besides, using the electrodes pairs (A), (B), (D), as to the human sera containing interfering component prepared by adding 4 mMol. of sodium salicylate or 4 mMol. of sodium gentisate and the human serum not added, potential differences (ΔmV) were measured to examine the influences of the interfering substances, and the results shown in Table 3 were obtained. By the data in Table 3, it is clear that the influence of the interfering substances is decreased in the electrodes pairs (A) and (D) having buffer layer compared with the electrodes pair (B) of control not having buffer layer.

TABLE 3

| Interfering Substance | Electrodes Pair (D) (ΔmV) | Electrodes Pair (A) (ΔmV) | Electrodes Pair (B) (ΔmV) |
|---|---|---|---|
| Salicylate | −7.6 | −11.5 | −56.0 |
| Gentisate | −6.2 | −8.4 | −13.8 |

We claim:

1. An ion-selective electrode for measuring carbonate concentration comprising layers in the following order:
   an electrically insulating support;
   a conductive metal layer on said support;
   a metal halide of said same conductive metal on said metal layer;
   a carbonate ion-selective layer containing an ion carrier; and
   a buffer layer of a hydrophilic polymer binder containing a buffer.

2. An ion-selective electrode pair for measuring carbonate concentrations, said electrodes being substantially electrically insulated from each other, comprising:
   an electrically insulating support;
   two layers of a conductive metal in a spaced-apart, side-by-side relationship so that said layers have opposing edges, said support having a depression between said opposing edges;
   a separate metal halide layer of said same conductive metal on each of said metal layers, which metal halide layers cover the opposing edges of the metal layer on which it is disposed;
   a continuous carbonate ion-selective layer containing an ion-carrier covering said metal halide layers, which ion-selective layer transverses and fills said depression; and
   a buffer layer comprising a hydrophobic polymer binder containing a pH buffer composition covering said ion-selective layer.

* * * * *